US006866444B2

United States Patent
Kim

(10) Patent No.: US 6,866,444 B2
(45) Date of Patent: Mar. 15, 2005

(54) DEVICE INSTALLED AT A DITCH ON A ROAD, TO PREVENT BACK FLOW OF SEWAGE AND MALODOR

(75) Inventor: Jin-Hwan Kim, Yongin (KR)

(73) Assignee: My's Tech Co., Ltd, Seoul (KR)

( * ) Notice: Subject to any disclaimer, the term of this patent is extended or adjusted under 35 U.S.C. 154(b) by 0 days.

(21) Appl. No.: 10/664,804

(22) Filed: Sep. 19, 2003

(65) Prior Publication Data

US 2004/0126188 A1 Jul. 1, 2004

(30) Foreign Application Priority Data

Mar. 22, 2001 (KR) .................................. 20-2001-0007978
Mar. 21, 2002 (KR) ................................. PCT/KR02/00482

(51) Int. Cl.[7] .............................................. E02D 29/14
(52) U.S. Cl. ............................ 404/4; 404/25; 405/94; 137/615
(58) Field of Search ................... 404/2, 4, 25; 405/37, 405/94; 251/12, 73, 349; 210/163, 170; 137/386, 615; 52/302.7

(56) References Cited

U.S. PATENT DOCUMENTS

| | | | | |
|---|---|---|---|---|
| 4,088,149 A | * | 5/1978 | Logsdon ..................... | 137/433 |
| 4,935,129 A | * | 6/1990 | Wang .......................... | 210/131 |
| 5,005,603 A | * | 4/1991 | Amundson et al. ......... | 137/192 |
| 5,323,804 A | | 6/1994 | Lin | |
| 5,487,701 A | * | 1/1996 | Schedegger et al. ........ | 454/271 |
| 5,944,445 A | * | 8/1999 | Montgomery ................ | 405/92 |
| 6,217,756 B1 | * | 4/2001 | Martinez ..................... | 210/163 |
| 6,287,050 B1 | * | 9/2001 | Montgomery et al. ........ | 405/92 |
| 6,726,402 B1 | * | 4/2004 | Martinez ..................... | 405/40 |

FOREIGN PATENT DOCUMENTS

| | | |
|---|---|---|
| JP | 2000-220202 | 8/2000 |
| JP | 2000-192491 | 11/2000 |
| KR | 10-1999-0037838 | 5/1999 |
| KR | 20-0193351 | 6/2000 |

OTHER PUBLICATIONS

International Search Report taken from PCT application No. PCT/KR02/00482.

* cited by examiner

Primary Examiner—Gary S. Hartmann
(74) Attorney, Agent, or Firm—Graybeal Jackson Haley LLP

(57) ABSTRACT

A device installed at a ditch on a road for preventing a backflow of sewage and a malodor is provided. The device includes a frame portion comprising a plurality of frames arranged in parallel with each other, a valve portion being opened or closed in a manner of a lever according to the weight of a flow of the sewage, and a cover portion for covering the frame portion and the valve portion. The cover portion includes flat drain holes formed in plural lines which are arranged in parallel with each other; flow velocity resistance embossings protruding upwardly with a predetermined height in a bar shape; inclined drain holes formed at both ends of the lengthwise direction and inclined upwardly; and a plurality of sliding prevention embossings protruding upwardly from an upper surface of the cover portion, for preventing walkers from sliding thereon.

8 Claims, 4 Drawing Sheets

DEVICE INSTALLED AT A DITCH ON A ROAD, TO PREVENT BACK FLOW OF SEWAGE AND MALODOR

PRIORITY CLAIM

This application claims priority from PCT Patent Application No. PCT/KR 02/00482 filed 21 Mar. 2002, which claims priority from Korean patent application No. 2001-7978 filed 22 Mar. 2001. Both patent applications are incorporated herein by reference.

FIELD OF THE INVENTION

The present invention relates to a device installed in a lid frame covering a ditch and a drain, for preventing a backflow of sewage and malodor, and more particularly, to a lid for covering a ditch comprising a frame made of material that has a predetermined hardness such as a hot-galvanized frame, a cast iron frame and a stainless frame, and a blocking valve having a lever valve and a quarter turn valve, the blocking valve installed in the frame.

DESCRIPTION OF THE RELATED ART

Since a general a lid for a ditch installed on a collecting-water well consists of a frame alone, an inner side of the ditch is left exposed and thus, malodor easily leaks out of the ditch. Accordingly, in order to prevent the malodor and a backflow of sewage, a valve is installed at an underside of the lid of the ditch or inside the ditch. Also, there is a lid frame that employs a valve capable of being opened and closed by a spring. All of the above-described types of lids for the ditch, however, have to be lifted from the ditch for cleaning or for removing garbage from the valve which is stuck open by the garbage. Accordingly, there is a problem of inconvenience.

DISCLOSURE OF THE INVENTION

The present invention has been developed in order to solve the above problem of the prior art. Accordingly, it is an object of the present invention to provide a lid for a ditch capable of preventing an intrusion of a light, but large garbage such as a plastic bag and fallen leaves, and being simply lifted from the ditch for cleaning when the ditch is blocked by the garbage. Accordingly, there is an advantage of reducing the costs in cleaning the ditch.

It is another object of the present invention to provide a device installed at a lid frame, for preventing a malodor and a noxious insect from coming out of the ditch.

It is still another object of the present invention to provide an inclined drain hole and a flow velocity prevention projection for compensating for a shortcoming of a flat lid of a drain installed in a sloped surface of a road, which does not allows rainwater to flow into the drain.

In order to achieve the above objects, according to the present invention, a device installed in a lid frame, for preventing a backflow of sewage and a malodor, is structured in a manner that a frame body able to stand a load is provided with hinge shaft recesses, quarter turn valve shafts and lever valve shafts are inserted into the hinge shaft recesses to be rotated, and a cover is integrally connected the frame by a welding.

The detailed descriptions of the present invention are as the followings.

A device for preventing a backflow of sewage and a malodor according to the present invention, includes a frame portion comprising a plurality of frames formed in parallel with each other, a valve portion inserted into recesses that are arranged in upper sides of the frames along a perpendicular direction to a lengthwise direction of the frames, the valve portion being opened or closed in a manner of a lever according to the weight of a flow of the sewage, and a cover portion for covering the frame portion and the valve portion to protect the frame portion and the valve portion from an external force.

The cover portion includes flat drain holes formed in plural lines which are arranged in parallel with each other, each of the lines being provided a plurality of passage holes formed therein, flow velocity resistance embossings which are disposed along the lines of the flat drain holes one by one, the flow velocity resistance embossings protruding upwardly with a predetermined height in a bar shape, inclined drain holes formed at both ends of the lengthwise direction and inclined upwardly, and a plurality of sliding prevention embossings protruding upwardly from an upper surface of the cover portion, for preventing walkers from sliding thereon.

Also, the frame portion is divided into both edge portions corresponding to the inclined drain holes of the cover portion, and a middle portion. The middle portion comprises the plurality of frames arranged in parallel with each other along the lengthwise direction, and the lever valve recesses formed in upper sides of the frames in the perpendicular direction to the frames. Each of both edge portions has a plurality of inclined frames extending from the frames, and quarter turn valve recesses disposed in the inclined frames in a line. The valve portion comprises lever valve means connected to the lever valve recesses formed in the middle portion of the frame portion, and quarter turn valve means connected with the quarter turn valve recesses formed in the both edge portions of the frame portion. The lever valve means are provided along a line of the lever valve recesses one by one. The lever valve means comprise lever valve hinge shafts passing through a plurality of lever valve, for connecting the lever valves with the frames by being inserted into the lever valve recesses; and a lever valve portion including hinge shaft connecting means shaped in a hollow cylinder to receive the lever valve hinge shafts; lever valves disposed at one side of the hinge shaft connecting means and shaped in a wide and long plate; and weights disposed at the other side of the hinge shaft connecting means, shaped in a narrow and short plate to have a weight heavier than the lever valves.

The quarter turn valve means comprise quarter valve hinge shafts inserted into the quarter turn valve recesses with a plurality of quarter turn valves being hung on one quarter valve hinge shaft, thereby connecting the quarter turn valves with the frames, and a plurality of quarter turn valves, each having one hooked end to hook on the quarter valve hinge shaft, the other end of the quarter turn valve being shaped in a wide and long plate vertically extending from the hooked end, and having weights formed at the other end.

BEST MODE OF THE INVENTION

Hereinafter, a preferred embodiment of the present invention will be described in greater detail with reference to the accompanying drawings.

Figure 2:
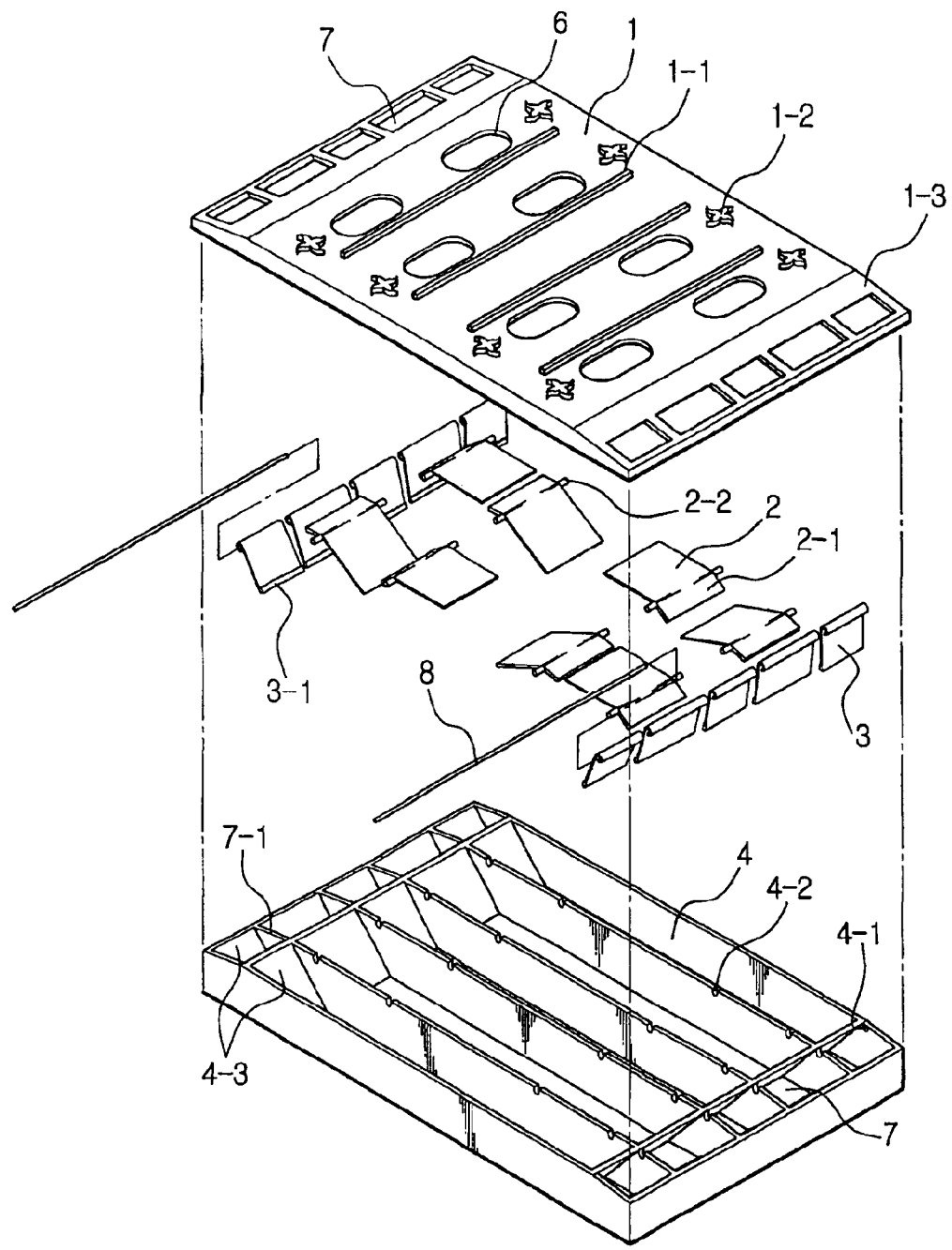
FIG. 2 is an exploded perspective view showing a lid for a ditch according to the present invention.
Figure 3:
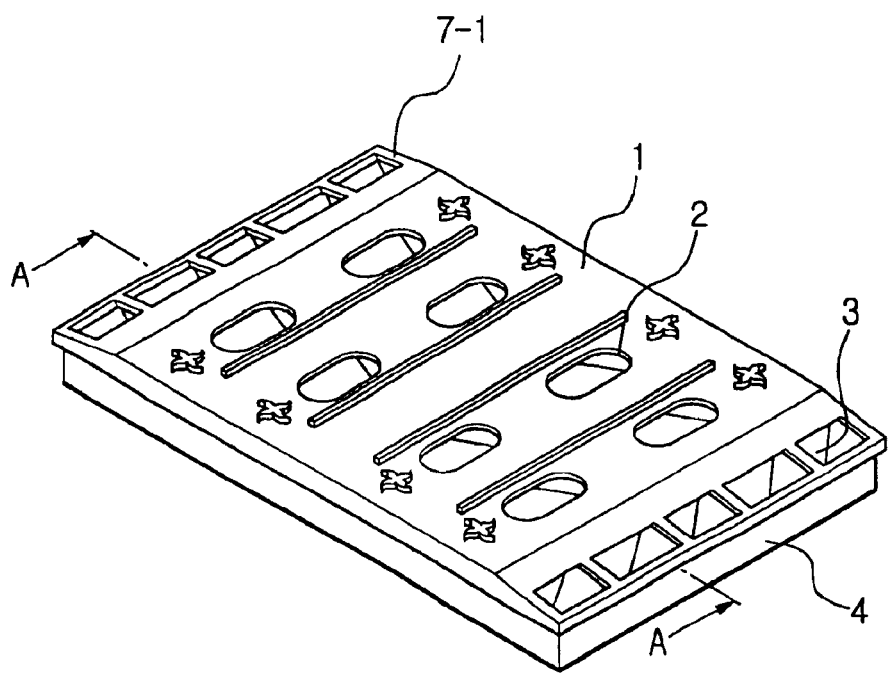
FIG. 3 is a perspective view showing a lid for a ditch according to the present invention in an assembled state.

FIG. 2 is an exploded perspective view showing a lid for a ditch installed in a lid frame, for preventing a backflow of sewage and a malodor, according to the present invention. As shown in FIG. 2, a frame 4 is provided with inclined frames 4-3 at both sides thereof to form inclined drain holes 7. Quarter turn valve hinge shafts 8 are inserted into quarter turn valve recesses 4-1 passing through the inclined frames 4-3. Lever valve hinge shafts 2-2 of the lever valves 2 are inserted into lever valve recesses 4-2 for hinging. Each of the lever valve recesses is formed in the frames with a sufficient size to accommodate the lever valves opening at a right angle. Quarter turn valves 3 are hung on the quarter turn valve hinge shafts 8 of the inclined drain holes 7 of the frame 4, and the lever valves 2 are positioned with the lever valve hinge shafts 2-2 being inserted into the lever valve recesses 4-2. An upper cover 1 is shaped to correspond to a shape of the frame 4, and has sliding prevention embossings 1-2 and flow velocity resistance embossings 1-1 formed on an upper surface of the upper cover 1. The upper cover 1 covers the frame and the valves by being connected to the frame by a welding such that valve surface opposing to the weights of the lever valves 2 comes in contact with the flat drain holes 6. Accordingly, the malfunction of the valves is prevented.

Although the quarter turn valve recesses and the lever valve recesses are directly formed in the frame in the above-described embodiment, this should not be considered as limiting. There can be an alternative embodiment in which the upper cover is provided with hinge hooks.

Figure 4:
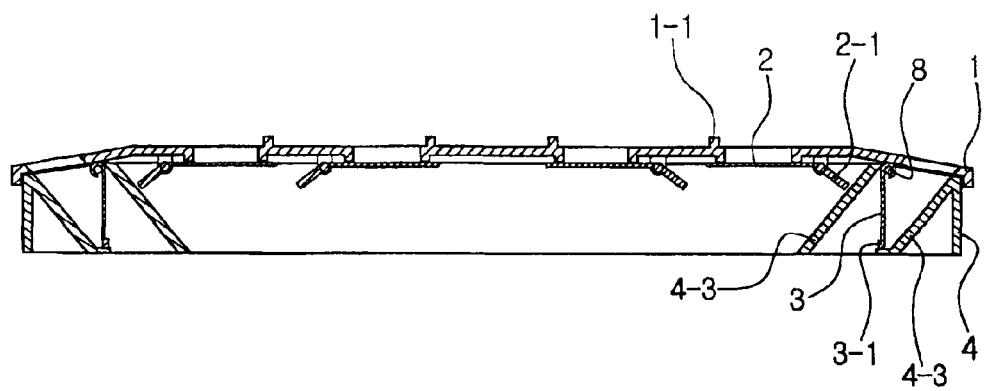
FIGS. 4 and 4B are sectional views showing a lid for a ditch of FIG. 3 according to the embodiment of the present invention.

The operation of the device installed at the lid frame for preventing the backflow of the sewage and the malodor will be described hereinbelow with reference to FIG. 4.

Figure 4B:
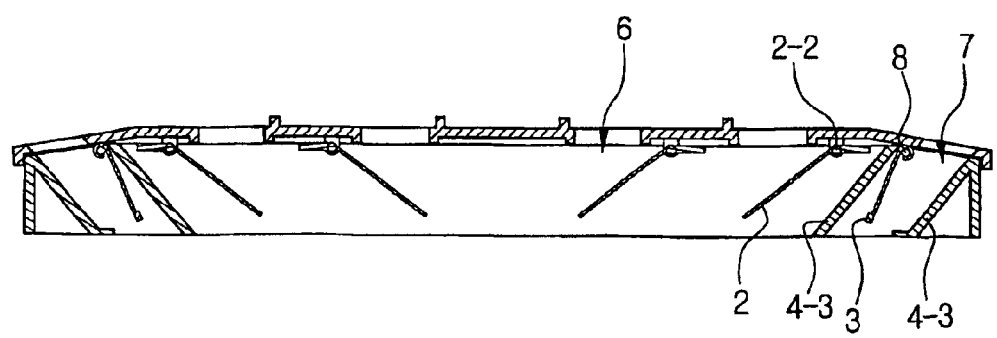

The height of the inclined frames 4-3 gradually increases from an end of the frame toward an inner side such that water on a road is guided to the ditch. At this time, as shown in FIG. 4B, the quarter turn valves 3 are opened in a manner that the flow of water pushes the weights 3-1 to turn the quarter turn valve hinge shaft 8. After water drainage, the quarter turn valves are returned the original position due to the weights 3-1 or their own weight and then maintain a closing condition in contact with the inclined frames 4-3. That is, the quarter valve hinge shafts 8 are positioned more outwardly than an end of an outer inclined frame such that the quarter turn valves come in contact with the inclined frames more tightly. Accordingly, the device installed in the lid frame for preventing the backflow of the sewage and the malodor is achieved by installing the quarter turn valves and the inclined frames consecutively.

Figure 1:
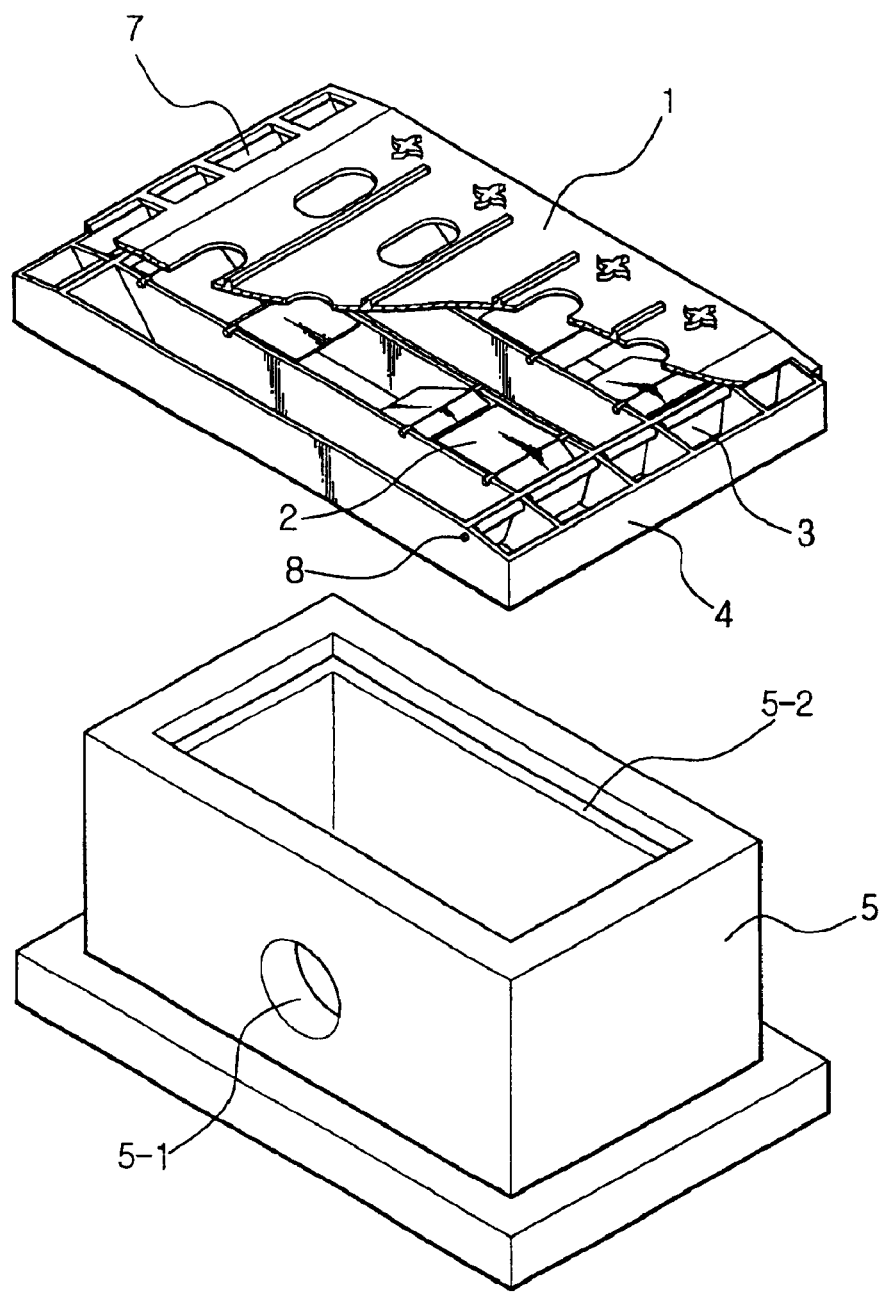
FIG. 1 is a perspective view showing a water-collecting well and a lid for a ditch according to an embodiment of the present invention.

Next, for an easy cleaning and a clean appearance, the lever valve 2, the weight 2-1 and the hinge shaft 2-2 of a rotation bearing may be integrally formed with each other. Also, for a quarter turning of the valve, the lever valve 2 is provided with a hook type weight such in which the weight 2-1 weighs heavier than the lever valve 2. The lever valve and the weight are inserted into the quarter turn valve recesses 4-1 of the frame. Then, the weight turns downwardly and the valve surface turns upwardly according to a lever principle. The cover 1 is provided with the flow velocity resistance embossings 1-1 disposed adjacent to the flat drain hole 6, for guiding the flow of rainwater over the lid into the flat drain hole 6. Accordingly, normally, the valves are closed to prevent the inflow of the garbage, and the valve surface and the cover surface are in parallel with each other such that the cleaning operation is easy. The prevention of the backflow of the sewage is accomplished by the weight. At this point, the valve surface subject to a backflow pressure is larger than the weight such that the lever valve is closed more tightly as the backflow pressure gets stronger. In order to prevent a separation of the lid during the backflow of the sewage and a missing of the lid, the lid for the ditch may be secured to a ditch lid seat angle portion 5-2 (Refer to FIG. 1) of the collecting-water well, i.e., the lid is assembled with the angle portion in a shape of "U". FIG. 4B shows the valve allowing the drainage of rainwater. As shown in FIG. 4B, the rainwater flows in through the flat draining hole 6, overcoming the weight 2-1. After the drainage of rainwater, the lever valve returns to its original position by the weight to close the flat drain holes 6, thereby preventing the leakage of malodor and the input of the sewage. The flat drain hole 6 is shaped similarly to the valve surface such that a cleaning becomes easy. Accordingly, the device for preventing the backflow of the sewage and the malodor is provided by installing the lever valve 2 in the frame 4 and the cover 1. As well known, the frame and cover can be integrally formed with each other by a molding, and then the valve can be assembled with the integrated frame and cover. As described above, by installing the blocking valves in the ditch lid, the ditch lid prevents the backflow of the sewage and the malodor, and also prevents a clogging of the ditch that is caused by the input of the garbage by simply cleaning. Accordingly, it can solve the sanitary problem.

What is claimed is:

1. A device installed at a ditch on a road for preventing a backflow of sewage and a malodor, including:

a frame portion comprising a plurality of frames arranged in parallel with each other;

a valve portion inserted into recesses that are formed in upper sides of the frames along a perpendicular direction to a lengthwise direction of the frames, the valve portion being opened or closed in a manner of a lever according to the weight of a flow of the sewage; and a cover portion for covering the frame portion and the valve portion to protect the frame portion and the valve portion from an external force wherein the cover portion includes:

flat drain holes formed in plural lines which are arranged in parallel with each other, each of the lines being provided with a plurality of passage holes formed therein;

flow velocity resistance embossings which are disposed along the lines of the flat drain holes one by one, the flow velocity resistance embossings protruding upwardly with a predetermined height in a bar shape;

inclined drain holes formed at both ends of the lengthwise direction and inclined upwardly; and a plurality of sliding prevention embossings protruding upwardly from an upper surface of the cover portion, for preventing walkers from sliding thereon.

2. The device of claim 1, wherein the frame portion is divided into both edge portions corresponding to the inclined drain holes of the cover portion, and a middle portion.

3. The device of claim 2, wherein the middle portion comprises:

the plurality of frames arranged in parallel with each other along the lengthwise direction; and lever valve recesses formed in the upper sides of the frames in the perpendicular direction to the frames.

4. The device of claim 3, wherein each of both edge portions has a plurality of inclined frames extending from the frames, and quarter turn valve recesses are disposed in the inclined frames in a line.

5. The device of claim 4, wherein the valve portion comprises:
   a lever valve connected to the lever valve recesses formed in the middle portion of the frame portion; and
   a quarter turn valve connected with the quarter turn valve recesses formed in the both edge portions of the frame portion.

6. The device of claim 5, wherein the lever valve are provided along each line of the lever valve recesses formed in the frames one by one, and the lever valve comprises:
   lever valve hinge shafts connected with a plurality of lever valves by passing through the lever valves, for connecting the lever valves with the frames by being inserted into the lever valve recesses; and
   a lever valve portion including:
   hinge shaft connecting means shaped in a hollow cylinder to receive the lever valve hinge shafts;
   lever valves disposed at one side of the hinge shaft connecting means and shaped in a wide and long plate; and
   weights disposed at the other side of the hinge shaft connecting means, shaped in a narrow and short plate to have a weight heavier than the lever valves.

7. The device of claim 6, wherein the quarter turn valve means comprises:
   quarter valve hinge shafts inserted into the quarter valve recesses with a plurality of quarter turn valves being hung on one quarter valve hinge shaft, thereby connecting the quarter turn valves with the frames; and
   a plurality of quarter turn valves each having one hooked end to hook on the quarter valve hinge shaft, the other end of the quarter turn valve being shaped in a wide and long plate vertically extending from the hooked end, and having weights formed at the other end.

8. The device of claim 1, wherein the frame portion is provided with an inclined frame, and quarter turn valves are inserted into quarter turn valve recesses such that the quarter turn valves and the inclined frames are served as a cover.

* * * * *